(12) United States Patent
Kim (10) Patent No.: US 11,894,179 B2
(45) Date of Patent: Feb. 6, 2024

(54) COIL ASSEMBLY AND SOLENOID VALVE INCLUDING SAME

(71) Applicant: HL MANDO CORPORATION, Pyeongtaek-si (KR)

(72) Inventor: Min Seong Kim, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 329 days.

(21) Appl. No.: 17/267,550

(22) PCT Filed: Aug. 2, 2019

(86) PCT No.: PCT/KR2019/009689
§ 371 (c)(1),
(2) Date: Feb. 10, 2021

(87) PCT Pub. No.: WO2020/032496
PCT Pub. Date: Feb. 13, 2020

(65) Prior Publication Data
US 2021/0319947 A1      Oct. 14, 2021

(30) Foreign Application Priority Data

Aug. 10, 2018   (KR) .................. 10-2018-0094035

(51) Int. Cl.
*F16K 31/06*           (2006.01)
*H01F 27/32*           (2006.01)
(Continued)

(52) U.S. Cl.
CPC ....... *H01F 27/325* (2013.01); *F16K 31/0675* (2013.01); *H01F 27/02* (2013.01); *H01F 27/2823* (2013.01)

(58) Field of Classification Search
CPC .... F16K 31/0675; H01F 27/325; H01F 27/02; H01F 27/2823; H01F 27/2828;
(Continued)

(56) References Cited

U.S. PATENT DOCUMENTS 3,670,274 A * 6/1972 Ellison ................ F16K 31/0627
                                                                  335/278
3,757,263 A * 9/1973 Saarem ................ H01F 7/1607
                                                                  335/262
(Continued)

FOREIGN PATENT DOCUMENTS

CN          1313611 A        9/2001
CN          1403324 A        3/2003
(Continued)

OTHER PUBLICATIONS

International Search Report dated Nov. 19, 2019, corresponding to International Application No. PCT/KR2019/009689 citing the above reference(s).
(Continued)

*Primary Examiner* — Matthew W Jellett
(74) *Attorney, Agent, or Firm* — Hauptman Ham, LLP (57) ABSTRACT

The present disclosure relates to a coil assembly including a bobbin including a winding part in which a passing hole is formed on an inner surface thereof and the coil is wound along an outer surface thereof, and an upper frame provided on an upper side of the winding part to limit an upper winding range of the coil, a lower case coupled to a lower side of the winding part and directly in contact with the coil to limit a lower winding range of the coil, and an upper case coupled to the lower case to surround an outer surface of the bobbin together with the lower case.

10 Claims, 10 Drawing Sheets

(51) Int. Cl.
*H01F 27/02* (2006.01)
*H01F 27/28* (2006.01)

(58) Field of Classification Search
CPC ...... H01F 27/306; H01F 27/081; H01F 7/127; H01F 7/1607; H01F 2007/062; B60T 8/36; B60T 8/363; B60Y 2400/81
USPC .................................................. 251/129.15
See application file for complete search history.

(56) References Cited

U.S. PATENT DOCUMENTS

| | | | | |
|---|---|---|---|---|
| 4,569,504 | A * | 2/1986 | Doyle | F16K 31/0675 335/279 |
| 4,725,802 | A * | 2/1988 | Johnson | H01F 7/1607 335/262 |
| 6,684,901 | B1 * | 2/2004 | Cahill | F16K 31/0655 251/291 |
| 6,786,467 | B2 * | 9/2004 | Gagnon | F02M 26/53 335/255 |
| 8,220,776 | B2 * | 7/2012 | Tagata | B60T 8/363 251/129.02 |
| 8,714,519 | B2 * | 5/2014 | Voss | B60T 8/363 303/119.2 |
| 10,139,006 | B2 * | 11/2018 | Muraoka | H01F 7/126 |
| 2013/0134339 | A1 * | 5/2013 | Miura | F16K 31/0655 251/337 |
| 2016/0120417 | A1 * | 5/2016 | Sano | F16K 31/0675 251/129.15 |

FOREIGN PATENT DOCUMENTS

| | | |
|---|---|---|
| CN | 102005833 A | 4/2011 |
| CN | 102549682 A | 7/2012 |
| CN | 103609007 A | 2/2014 |
| CN | 204204546 U | 3/2015 |
| CN | 105818794 A | 8/2016 |
| CN | 206290806 U | 6/2017 |
| CN | 206723550 U | 12/2017 |
| JP | 2007-067090 A | 3/2007 |
| JP | 2010-171059 A | 8/2010 |
| JP | 2016-119365 A | 6/2016 |
| KR | 10-2005-0045760 A | 5/2005 |
| KR | 10-2014-0110306 A | 9/2014 |

OTHER PUBLICATIONS

Chinese Office Action dated Mar. 11, 2022, in connection with the Chinese Patent Application No. 201980053570.8 citing the above reference(s).
Chinese Office Action dated Apr. 28, 2023 for corresponding Chinese Patent Application No. 201980053570.8, 10 pages.

* cited by examiner

COIL ASSEMBLY AND SOLENOID VALVE INCLUDING SAME

CROSS-REFERENCE TO RELATED APPLICATION

The present application is a national stage filing under 35 U.S.C § 371 of PCT application number PCT/KR2019/009689 filed on Aug. 2, 2019, which is based upon and claims the benefit of priorities to Korean Patent Application No. 10-2018-0094035, filed on Aug. 10, 2018, in the Korean Intellectual Property Office. The disclosures of the above-listed applications are hereby incorporated by reference herein in their entireties.

TECHNICAL FIELD

The present disclosure relates to a coil assembly provided in an electronically controlled brake system and a solenoid valve having the same.

BACKGROUND ART

In general, various types of brake systems have been proposed to provide a braking force to a vehicle. For example, brake systems include an anti-lock brake system (ABS) that prevents the vehicle from slipping, an electronically controlled hydraulic brake system (EHB), and a vehicle attitude control system (ESC).

An electronically controlled brake system includes a hydraulic block (HCU) equipped with a plurality of solenoid valves for regulating braking hydraulic pressure transferred to wheel brakes, a low pressure accumulator for temporarily storing oil, a pump for forcibly pumping oil stored in the low pressure accumulator, a high pressure accumulator for reducing pressure pulsation of oil pumped from the pump, and the like, and an electronic control unit (ECU) for controlling electrically operated components.

The electronic control unit includes a printed circuit board (PCB) and is coupled to the hydraulic block by a fastening member such as bolts to control the electrically operated components. The solenoid valve includes a coil assembly in which a coil is wound to generate an electromagnetic field when power is applied, and a valve assembly to open and close an internal flow path by the electromagnetic field generated from the coil assembly.

The coil assembly is coupled such that a positive lead wire formed on the coil assembly is electrically connected to the printed circuit board for the operation of the valve assembly, and the valve assembly is installed such that a part of the valve assembly is fitted into the center of the coil assembly and the remaining part is pressed into the hydraulic block made of aluminum.

The coil assembly generally includes a coil made of a copper wire, a bobbin made of plastic (PA; polyamide) having a low heat transfer rate, and a case made of steel, and such a coil assembly has poor heat transfer efficiency.

When heat is generated from the coil, the heat is transferred to the aluminum hydraulic block through the bobbin and the case, and as the heat is transferred through the plastic bobbin having a low heat transfer rate, cooling efficiency is lowered and damage such as carbonization of the bobbin occurs during high temperature operation.

Korean Patent Publication No. 10-2014-0110306 has been published on Sep. 17, 2014 as an example of a conventional coil assembly and a solenoid valve having the same.

DISCLOSURE

Technical Problem

The present disclosure is directed to providing a coil assembly having a simple manufacturing process, excellent electromagnetic performance and heat dissipation performance, and a solenoid valve having the same.

Technical Solution

An aspect of the present disclosure provides a coil assembly including a bobbin including a winding part in which a passing hole is formed on an inner surface thereof and the coil is wound along an outer surface thereof, and an upper frame provided on an upper side of the winding part to limit an upper winding range of the coil, a lower case coupled to a lower side of the winding part and directly in contact with the coil to limit a lower winding range of the coil, and an upper case coupled to the lower case to surround an outer surface of the bobbin together with the lower case.

The upper case may be assembled by being coupled to a radially outer surface of the lower case in a state in which the lower case is coupled to a lower surface of the bobbin.

The bobbin may further include a protrusion provided on an upper side of the upper frame and fitted into an insertion hole formed on an upper side of the upper case, and a lead wire installed on the protrusion to guide power supply to the coil.

When installed in a hydraulic block, the lower case may be provided such that an upper surface thereof is in contact with the coil and a lower surface thereof is in contact with the hydraulic block, thereby mediating heat conduction between the coil and the hydraulic block.

The winding part on which the coil is wound may be made of a first material, and the lower case may be made of a second material having a relatively higher thermal conductivity than the first material.

The bobbin and the lower case may be integrally formed.

The lower case may be made of a metal material, the bobbin may be made of a resin material, and the lower case and the bobbin may be molded by insert injection.

The lower case may be made of a metal material having a plurality of coupling holes, the bobbin may be made of a resin material having a plurality of studs corresponding to the plurality of coupling holes, and the lower case and the bobbin may be coupled by thermal fusion.

The lower case may be made of a metal material having one of female threads and male threads, the bobbin may be made of a resin material having the other of the female threads and the male threads, and the lower case and the bobbin may be coupled by the threaded connection.

The lower case may be made of a metal material having one of a locking step and a hook, the bobbin may be made of a resin material having the other of the locking step and the hook, and the lower case and the bobbin may be snap-fitted by engaging the locking step and the hook.

Another aspect of the present disclosure provides a solenoid valve including the coil assembly described as above, and a valve assembly fitted into the passing hole and configured to open and close an orifice depending on whether the coil assembly is operated or not, wherein the lower case is interposed between the coil and the hydraulic block.

Advantageous Effects

A coil assembly according to the present disclosure can significantly increase the heat radiation performance because a coil and a lower case are in direct contact so that heat is directly conducted from the coil to the lower case and from the lower case to a hydraulic block.

In addition, a winding space capable of increasing an electromagnetic force can be secured by a structure in which a bobbin and the lower case are integrally manufactured. As the lower case performs the function of a lower frame of a conventional bobbin, the coil can be further wound by a thickness of the lower frame, and as a result, an increase of more than 7% in electromagnetic force is expected compared to the conventional one. When the coil is not wound further, the size of the coil assembly can be reduced by the thickness of the lower frame.

In addition, in twice processes of assembling an upper case and the lower case 150, respectively, after assembling the bobbin, the bobbin and the lower case are changed into an integrated structure, so that the assembly process can be reduced to one time, thereby reducing production time and process cost.

MODE OF THE DISCLOSURE

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration. Like reference numbers or signs in the various drawings of the application represent parts or components that perform substantially the same functions.

Figure 1:
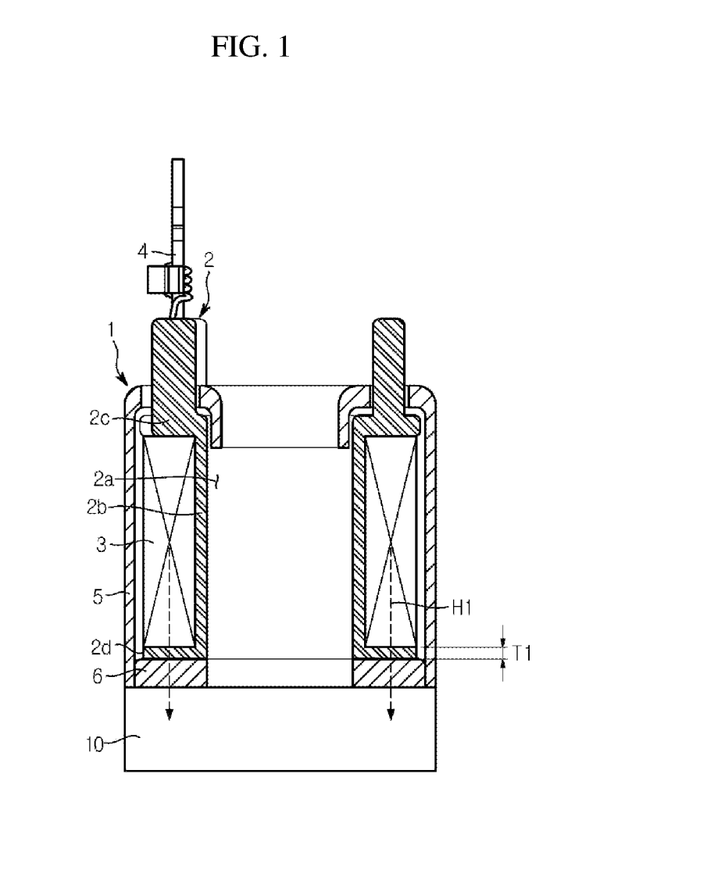
FIG. 1 is a cross-sectional view of a conventional coil assembly in which heat transfer paths are indicated.

FIG. 1 is a cross-sectional view of a conventional coil assembly in which heat transfer paths are indicated. Referring to the drawing, a conventional coil assembly 1 includes a cylindrical bobbin 2 in which the coil 3 is wound several times, cases 5 and 6 coupled to surround the bobbin 2, and a pair of lead wires 4 fixed to an upper portion of the bobbin 2 by insert molding.

The bobbin 2 includes a winding part 2b in which the coil 3 is installed on an outer surface thereof, and an upper frame 2c and a lower frame 2d limiting a winding range of the coil 3 at upper and lower sides, respectively. The bobbin 2 has a cylindrical shape, and a passing hole 2a is formed at the center thereof so that an upper portion of a valve assembly 200 is inserted. The cases 5 and 6 include the cylindrical upper case 5 coupled to surround an outer side of the bobbin 2 and having an open lower side, and the lower case 6 covering the lower opening of the upper case 5 in a state in which the bobbin 2 is received in and coupled to the upper case 5.

Passing holes are formed in a central portion of an upper surface of the upper case 5 and a central portion of the lower case 6, respectively, so that the valve assembly is inserted therethrough. One side of the lead wire 4 is connected to an end of the coil 3 to guide power supply, and the other side thereof is coupled to a printed circuit board to be electrically connected.

The coil assembly generally 1 includes the coil 3 made of a copper wire, the bobbin 2 made of plastic (PA; polyamide) having a low heat transfer rate, and the cases 5 and 6 made of steel, and such the coil assembly 1 has poor heat transfer efficiency on a heat transfer path H1. Although not shown in detail, the coil 3 includes an insulating coating such as enamel.

When heat is generated from the coil 3, the heat is transferred to a hydraulic block made of aluminum through the bobbin 2 and the cases 5 and 6, and as the heat is transferred through the plastic bobbin 2 having a low heat transfer rate, cooling efficiency is lowered and damage such as carbonization of the lower frame 2d occurs during high temperature operation.

Figure 2:
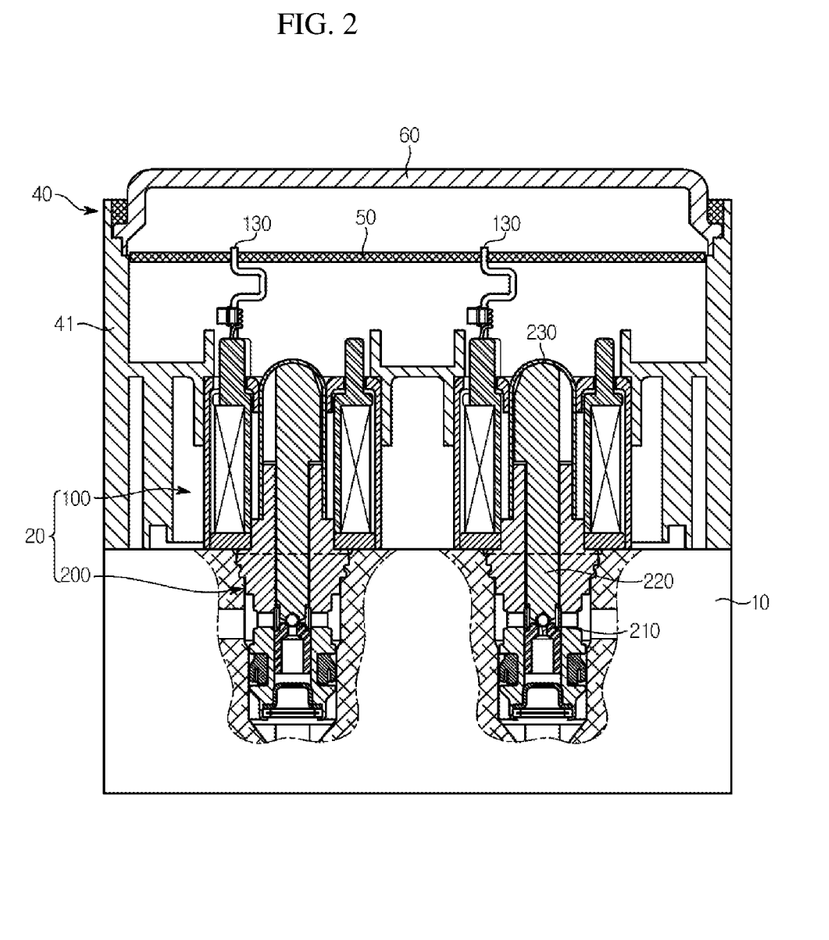
FIG. 2 is a cross-sectional view of a hydraulic block in which solenoid valves are installed according to an embodiment of the present disclosure.
Figure 3:
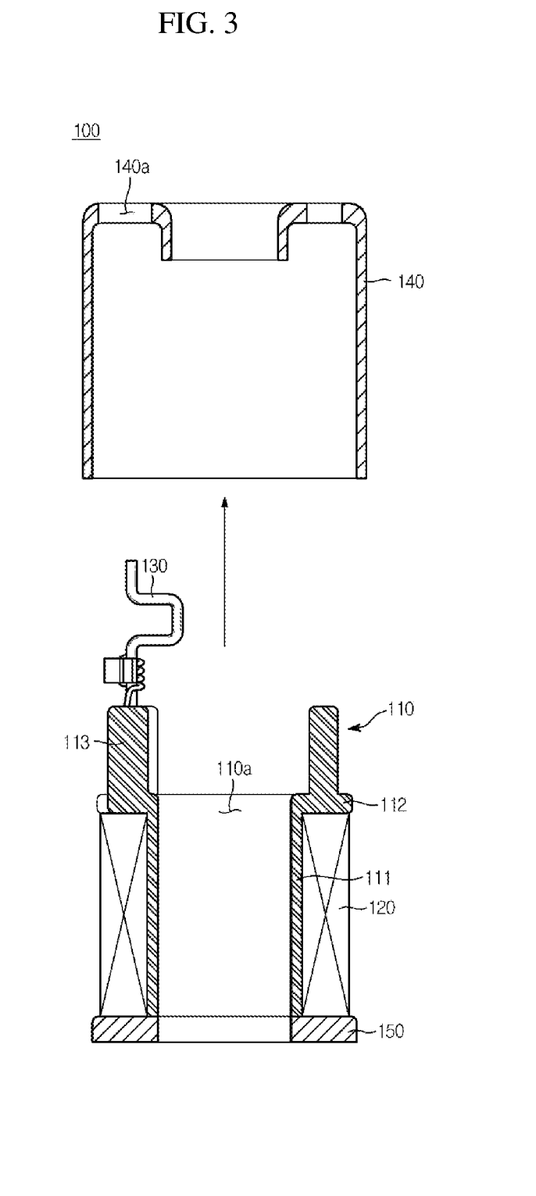
FIG. 3 is a view showing a coil assembly before assembly according to an embodiment of the present disclosure.
Figure 4:
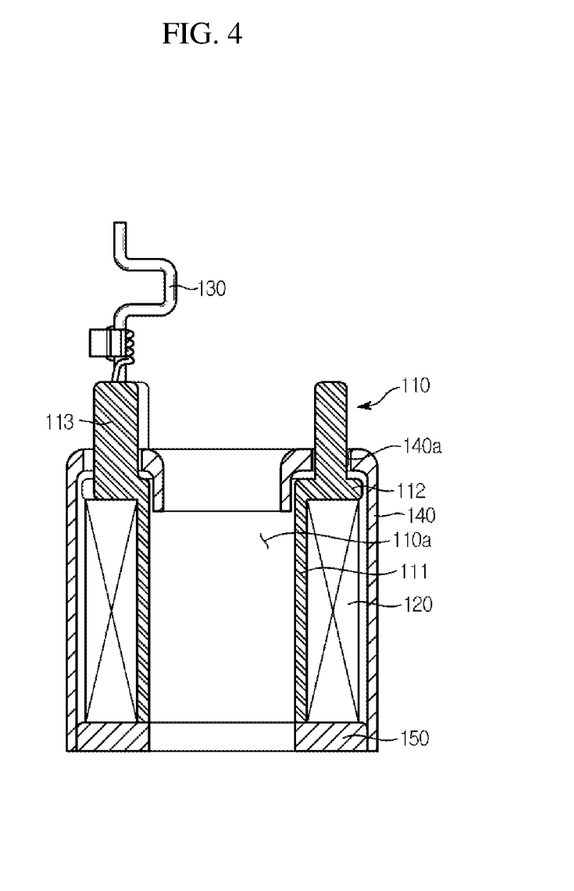
FIG. 4 is a view showing the coil assembly after assembly according to an embodiment of the present disclosure.

FIG. 2 is a cross-sectional view of a hydraulic block 10 in which solenoid valves 20 are installed according to an embodiment of the present disclosure, FIG. 3 is a view showing a coil assembly 100 before assembly, and FIG. 4 is a view showing the coil assembly 100 after assembly. FIGS. 5 to 8 are views for explaining methods of assembling a bobbin and a lower case of the coil assembly 100, and FIG. 9 shows the coil assembly 100 in which heat transfer paths are indicated.

Referring to the drawings, an electronically controlled brake system includes the hydraulic block 10 to which a plurality of solenoid valves 20 for regulating braking hydraulic pressure transferred to wheel brakes (not shown) is press-fitted, and an electronic control unit 40 coupled to the hydraulic block 10.

The hydraulic block 10 is a hybrid control unit (HCU) and may be a top-level controller that is mounted on a hybrid vehicle and controls the driving and overall state of the vehicle.

The hybrid vehicle connects controllers such as an engine control unit (ECU), a transmission control unit (TCU), a battery management system (BMS), and a motor control unit (MCU) to each other with the HCU as the center, and the hydraulic block 10 may perform a function of checking various states such as a request of a driver, an engine state, and a battery state, and optimally distributing power depending on a driving situation.

In addition to the solenoid valves 20, the hydraulic block (HCU) is equipped with a low pressure accumulator (not shown) for temporarily storing oil, a pump (not shown) for forcibly pumping oil stored in the low pressure accumulator, a motor (not shown) for driving the pump, a high pressure accumulator (not shown) for reducing pressure pulsation of oil pumped from the pump, and the like, and the electronic components provided in the hydraulic block 10 are controlled by the electronic control unit 40 and perform a braking operation.

The solenoid valve 20 includes the valve assembly 200 having a sleeve 230 in which the armature 220 is capable of advancing and retreating to open and close an orifice 210, and the coil assembly 100 through and to which the sleeve 230 is easily penetrated and coupled to operate an armature 220 with an electromagnetic force generated when power is applied, and may be installed on the hydraulic block 10. The valve assembly 200 is coupled by a lower portion thereof being press-fitted into the hydraulic block 10, and the coil assembly 100 is installed in the hydraulic block 10 and a housing 41 of the electronic control unit 40 together with the upper portion of the valve assembly 200.

The electronic control unit 40 includes the housing 41 coupled to the hydraulic block 10 and having open upper and lower portions, a printed circuit board 50 mounted in the upper opening of the housing 41, and a cover 60 covering the open upper portion of the housing 41. That is, the electronic control unit 40 allows an upper portion of the solenoid valve 20 to be accommodated in the lower opening of the housing 41 and is coupled to the hydraulic block 10 using mount bolts (not shown). The printed circuit board 50 is disposed and installed in the upper opening of the housing 41 to be spaced apart from the coil assembly 100 by a predetermined distance.

Referring to FIG. 3, the coil assembly 100 includes a bobbin 110 including a winding part 111 in which a passing hole is formed on an inner surface thereof and the coil 120 is wound along an outer surface thereof, and an upper frame 112 provided on an upper side of the winding part 111 to limit an upper winding range of the coil 120, a lower case 150 coupled to a lower side of the winding part 111 to limit a lower winding range of the coil 120 together with the upper frame 112, and an upper case 140 coupled to the lower case 150 to surround an outer surface of the bobbin 110 together with the lower case 150. The lower case 150 according to the present disclosure is constituted by being integrally provided with the lower frame 2d and the lower case 6 of the conventional bobbin 2 shown in FIG. 1 and may simultaneously perform their functions.

The coil assembly 100 includes the cylindrical bobbin 110 in which the coil 120 is wound several times, the cases 140 and 150 coupled to surround the bobbin 110, and a pair of lead wires 130 fixed to an upper portion of the bobbin 110 by insert molding. The coil assembly 100 has a cylindrical shape, and the upper portion of the valve assembly 200 is inserted at the center thereof. The cases 140 and 150 include the upper case 140 having a cylindrical shape coupled to surround the outside of the bobbin 110 and having an open lower portion, and the lower case 150 covering the lower opening of the upper case 140 in a state in which the bobbin 110 is accommodated in and coupled to the upper case 140.

The bobbin 110 includes a bobbin passing hole 110a into which the valve assembly 200 is inserted, and a protrusion 113 provided at an upper side of the upper frame 112. The protrusion 113 is fitted into an insertion hole 140a formed on an upper side of the upper case 140. The lead wire 130 extends from an upper surface of the protrusion 113 and is easily connected to the printed circuit board 50 to guide power supply to the coil 120.

When installed in the hydraulic block 10, the lower case 150 is provided such that an upper surface thereof is in contact with the coil 120 and a lower surface thereof is in contact with the hydraulic block 10, thereby mediating heat conduction between the coil 120 and the hydraulic block 10.

The winding part 111 on which the coil 120 is wound may be made of a first material, and the lower case 150 may be made of a second material having a relatively higher thermal conductivity than the first material. The first material may be a plastic (synthetic resin) material having a thermal conductivity of 0.2 W/mK, and the second material may be an iron (metal) material having a thermal conductivity of 80 W/mK. Accordingly, because heat is directly conducted from the coil 120 to the hydraulic block 10 through the lower case 150 made of steel, the coil assembly 100 may have improved heat radiation performance.

The upper case 140 is assembled by being coupled to a radially outer surface of the lower case 150 in a state in which the lower case 150 is coupled to a lower surface of the bobbin 110. Passing holes are formed at a central portion of the upper surface of the upper case 140 and a central portion of the lower case 150, respectively, so that the sleeve 230 of the valve assembly 200 penetrates and is inserted therethrough. One side of the lead wire 130 is connected to an end of the coil 120 to guide power supply, and the other side thereof is coupled to the printed circuit board 50 to be electrically connected.

FIGS. 5 to 8 illustrate various methods of coupling the lower case 150 and the bobbin 110 according to the present embodiment. In the drawings, the protrusion 113 provided at the upper side of the upper frame 112 is not shown.

Figure 5:
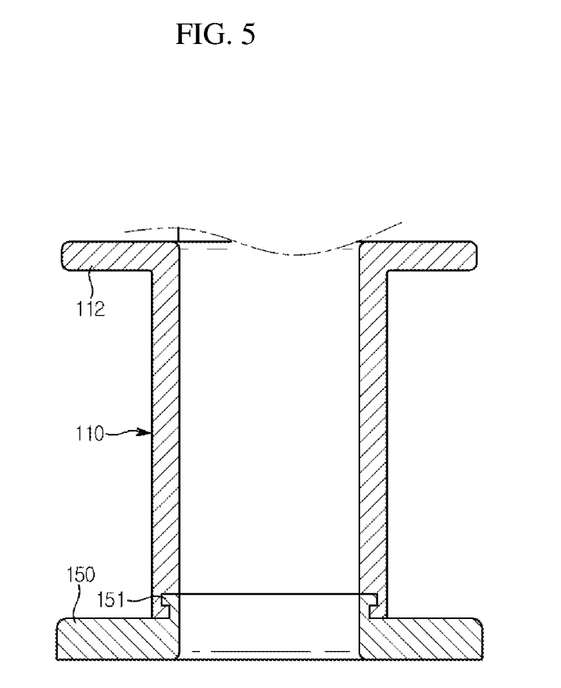
FIG. 5 is a view showing a first assembly method of a bobbin and a lower case of the coil assembly according to an embodiment of the present disclosure.

Referring to FIG. 5 schematically showing an insert injection method, which is a first assembly method of the bobbin 110 and the lower case 150, a protrusion 151 protruding upward is provided on the lower case 150 made of a metal material, and the bobbin 110 and the lower case 150 are molded by melt-injecting and curing a raw material of the bobbin in a state in which the lower case 150 having the protrusion 151 is embedded in a cavity of a mold. During injection, the resin melt flows into and fills the shape of the metal protrusion 151, so that the binding of the two members becomes more rigid. The present embodiment exemplifies that the protrusion 151 is formed in a "¬" shape, but the present disclosure is not limited thereto, and various other shapes having a large surface area may be included.

Figure 6:
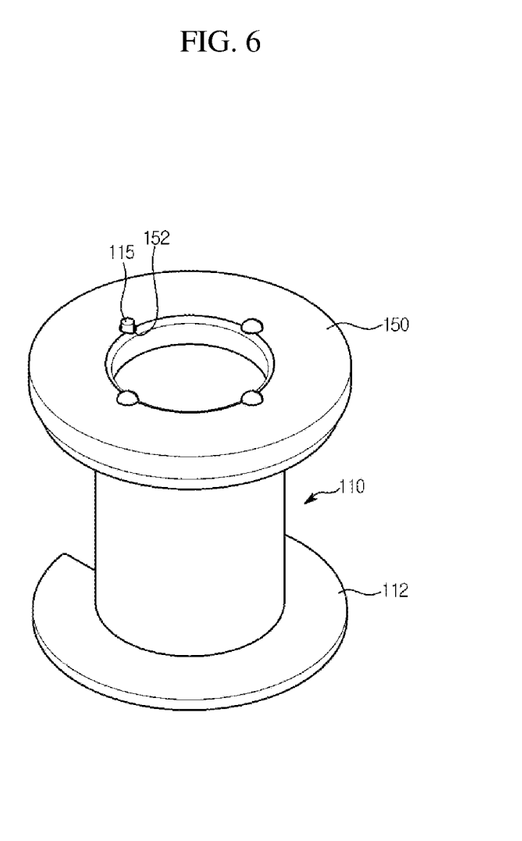
FIG. 6 is a view showing a second assembly method of the bobbin and the lower case of the coil assembly according to an embodiment of the present disclosure.

Referring to FIG. 6 showing a thermal fusion (heat staking) method, which is a second assembly method of the bobbin 110 and the lower case 150, A plurality of coupling holes 152 is provided on the lower case 150 made of metal, and a plurality of studs 115 coupled to the coupling holes 152 is provided to protrude from the corresponding bobbin 110, and then heat is applied to the studs 115 to be melt-bonded after assembling the two members. This method is mainly used between parts in which assembly portions are inconspicuous, do not take a large load, and do not need to be disassembled after assembly. In this case, the bobbin 110 may be manufactured in advance through a separate injection process.

Figure 7:
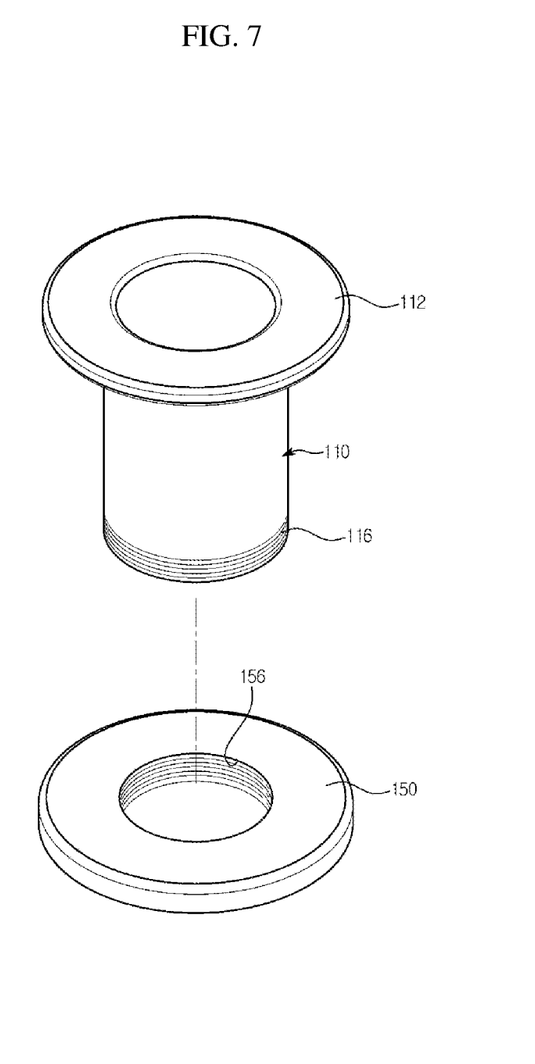
FIG. 7 is a view showing a third assembly method of the bobbin and the lower case of the coil assembly according to an embodiment of the present disclosure.

Referring to FIG. 7 showing a threaded connection method, which is a third assembly method of the bobbin 110 and the lower case 150, female threads 156 are provided on the lower case 150 made of a metal material, male threads 146 are provided on the corresponding bobbin 110, and are engaged together during assembly. Unlike the present embodiment, although male threads may be provided on the lower case 150 and female threads may be provided on the bobbin 110, and may be coupled to each other, in this case, a step may be formed in the passing hole of the bobbin 110 after assembling, so that the assembly of the valve assembly 200 may become unstable.

Figure 8:
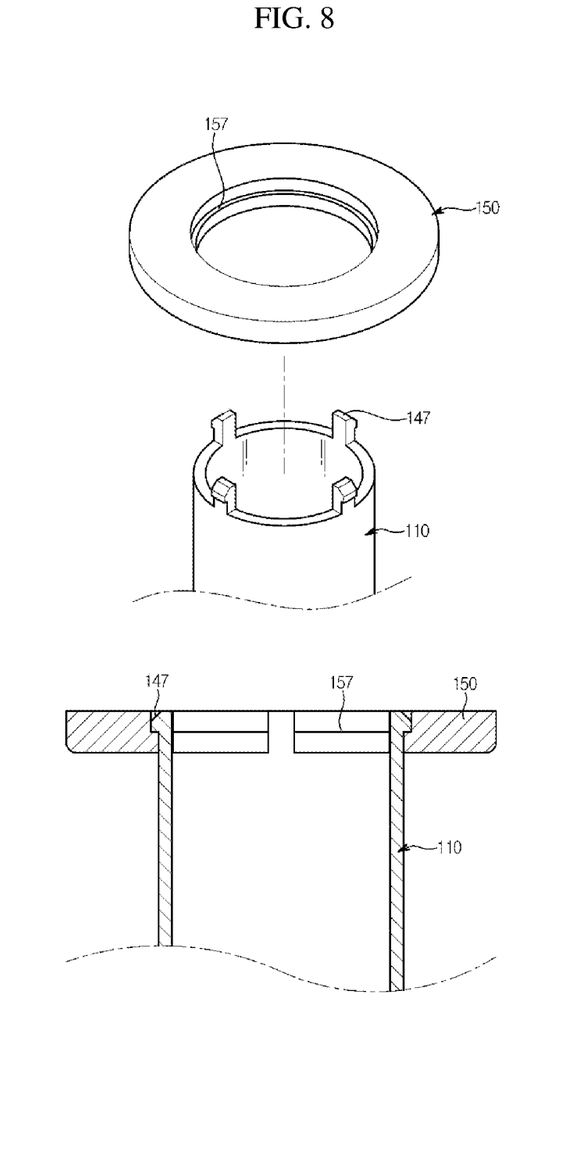
FIG. 8 is a view showing a fourth assembly method of the bobbin and the lower case of the coil assembly according to an embodiment of the present disclosure.
Figure 9:
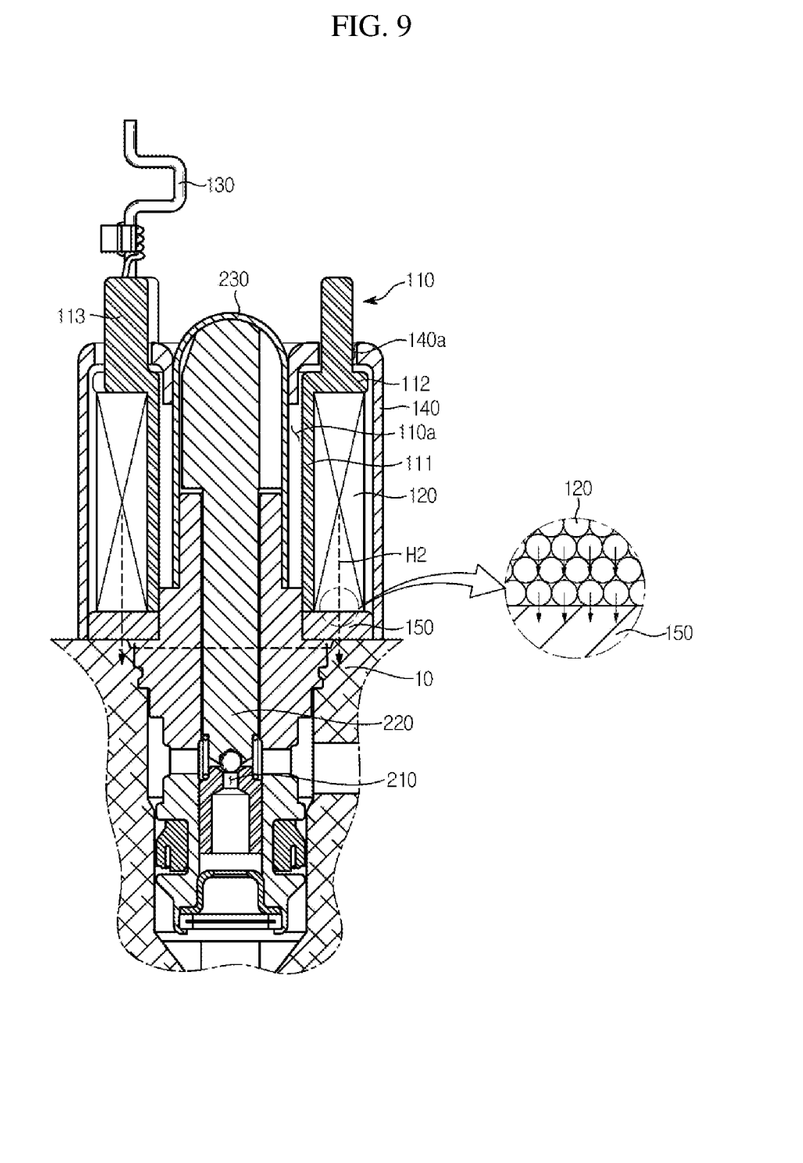
FIG. 9 is a cross-sectional view of the coil assembly according to an embodiment of the present disclosure in which heat transfer paths are indicated.

Referring to FIG. 8 showing a snap-fit method, which is a fourth assembly method of the bobbin 110 and the lower case 150, locking steps 157 are provided on an inner circumferential surface of the lower case 150 made of a metal material, and a plurality of hooks 117 coupled to the locking steps 157 is provided on the corresponding bobbin 110 to protrude at predetermined intervals, and then the two members are fitted to complete the assembly. Because the valve assembly is inserted into the passing hole of the bobbin 110 after assembling the locking steps and the hooks, the coupling of the two members may be firmly maintained. The present embodiment illustrates that the locking steps 157 are formed in a ring shape, but the present disclosure is not limited thereto, and the locking steps have a groove shape and may be provided to correspond to the number of hooks 117. In addition, the present embodiment illustrates that the lower case 150 is provided with the locking steps and the bobbin 110 is provided with the hooks, but may be provided in a manner opposite to the above.

Referring to FIG. 9, the coil assembly 100 according to the present embodiment may significantly increase the heat radiation performance because heat generated from the coil 120 is directly conducted from the coil 120 of a metal material to the lower case 150 of a metal material (see the enlarged view). That is, a medium (for example, a lower frame of a conventional bobbin) that interferes with the heat transfer between the coil 120 and the metal cases 140 and 150 is excluded, thereby maximizing the heat radiation performance.

Figure 10:
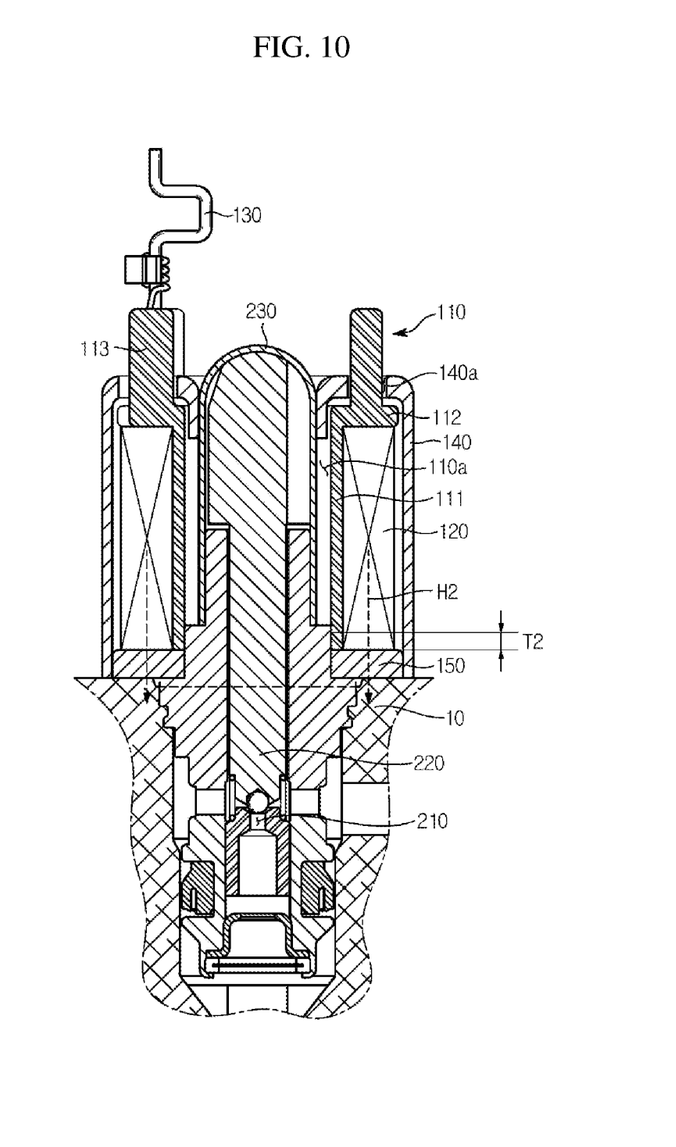
FIG. 10 is a view showing a coil assembly after assembly according to another embodiment of the present disclosure.

In addition, as shown in FIG. 10, as the coil assembly 100 according to another embodiment has a structure in which the bobbin 110 and the lower case 150 are integrally manufactured, a winding space that may increase an electromagnetic force may be secured. That is, in the present embodiment, the lower case 150 performs the function of the lower frame of the conventional bobbin, so that the coil may be further wound as much as the thickness of the lower frame (see T1 in FIGS. 1 and T2 in FIG. 9), and as a result, an increase of 7% or more in electromagnetic force is expected compared to the conventional one. When the coil is not wound further, the size of the coil assembly may be reduced by the thickness of the lower frame.

In addition, in twice processes of assembling the upper case 140 and the lower case 150, respectively, after assembling the bobbin 110, the bobbin 110 and the lower case 150 are changed into an integrated structure, so that the assembly process may be reduced to one time, thereby reducing production time and process cost.

In addition, the lower case 150 directly coupled to the bobbin 110 is firmly fixed to the hydraulic block 10, so that the operating noise generated between the bobbin and the lower case provided separately due to the conventional twice assembly processes may be eliminated or significantly reduced.

The foregoing has illustrated and described specific embodiments. However, it should be understood by those of skilled in the art that the disclosure is not limited to the above-described embodiments, and various changes and modifications may be made without departing from the technical idea of the disclosure described in the following claims.

The invention claimed is:

1. A coil assembly comprising:
a bobbin comprising a winding part in which a passing hole is formed on an inner surface thereof and a coil is wound along an outer surface thereof, and an upper frame provided on an upper side of the winding part to limit an upper winding range of the coil;
a lower case coupled to a lower side of the winding part and directly in contact with the coil to limit a lower winding range of the coil; and
an upper case coupled to the lower case to surround an outer surface of the bobbin together with the lower case,
wherein
the lower case has
an upper surface directly in contact with the coil and a lower surface of the winding part, and
an inner surface continuously extending downward from the upper surface and aligned with the inner surface of the winding part.

2. The coil assembly according to claim 1, wherein
the upper case is assembled by being coupled to a radially outer surface of the lower case in a state in which the lower case is coupled to a lower surface of the bobbin.

3. The coil assembly according to claim 1, wherein
the bobbin further comprises a protrusion provided on an upper side of the upper frame and fitted into an insertion hole formed on an upper side of the upper case, and a lead wire installed on the protrusion to guide power supply to the coil.

4. The coil assembly according to claim 1, wherein
when installed in a hydraulic block, the lower case is provided such that an upper surface thereof is in contact with the coil and a lower surface thereof is in contact with the hydraulic block, thereby mediating heat conduction between the coil and the hydraulic block.

5. The coil assembly according to claim 1, wherein
the winding part on which the coil is wound is made of a first material, and the lower case is made of a second material having a relatively higher thermal conductivity than the first material.

6. The coil assembly according to claim 1, wherein
the bobbin and the lower case are integrally formed.

7. The coil assembly according to claim 6, wherein
the lower case is made of a metal material, the bobbin is made of a resin material, and the lower case and the bobbin are coupled by insert injection.

8. The coil assembly according to claim 6, wherein
the lower case is made of a metal material having a plurality of coupling holes, the bobbin is made of a resin material having a plurality of studs corresponding to the plurality of coupling holes, and the lower case and the bobbin are coupled by thermal fusion.

9. The coil assembly according to claim 6, wherein
the lower case is made of a metal material having one of a locking step and a hook, the bobbin is made of a resin material having the other of the locking step and the hook, and the lower case and the bobbin are snap-fitted by engaging the locking step and the hook.

10. A solenoid valve comprising:
the coil assembly according to claim 1; and
a valve assembly fitted into the passing hole and configured to open and close an orifice depending on whether the coil assembly is operated or not,
wherein the lower case is interposed between the coil and the hydraulic block.

* * * * *